March 19, 1935. A. MOORE Re. 19,504
FLANGED REENFORCED PAPER ARTICLE AND PROCESS OF MAKING SAME
Original Filed June 22, 1926 3 Sheets-Sheet 1
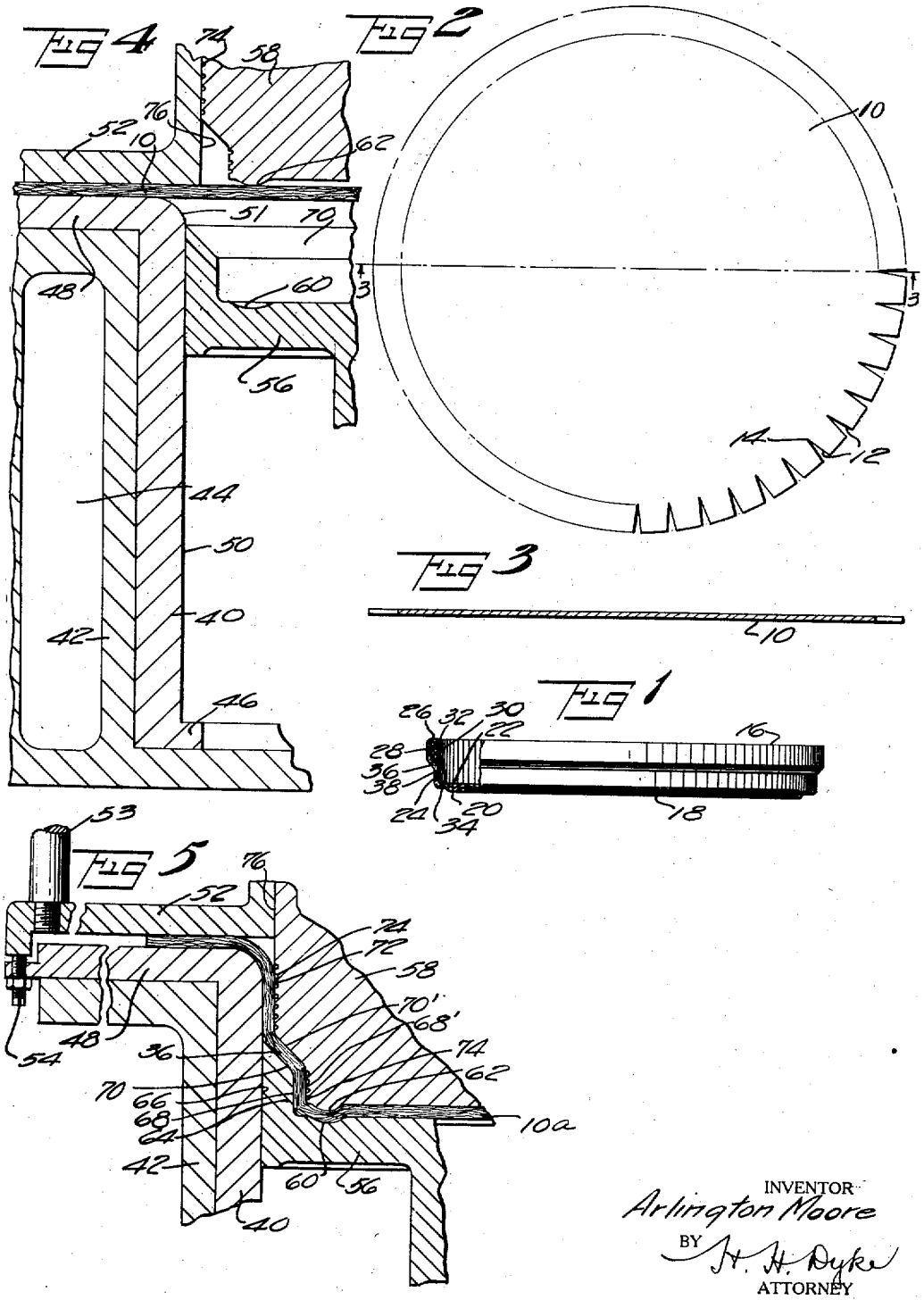
INVENTOR
Arlington Moore
BY
H. H. Dyke
ATTORNEY

FLANGED REENFORCED PAPER ARTICLE AND PROCESS OF MAKING SAME

Original Filed June 22, 1926 3 Sheets-Sheet 2

INVENTOR
Arlington Moore
BY
H. H. Byke
ATTORNEY

March 19, 1935. A. MOORE Re. 19,504

FLANGED REENFORCED PAPER ARTICLE AND PROCESS OF MAKING SAME

Original Filed June 22, 1926 3 Sheets-Sheet 3

INVENTOR
Arlington Moore
BY
H. H. Dyke
ATTORNEY

Reissued Mar. 19, 1935

Re. 19,504

UNITED STATES PATENT OFFICE 19,504

FLANGED REENFORCED PAPER ARTICLE AND PROCESS OF MAKING SAME

Arlington Moore, Louisville, Ky., assignor to Humoco Corporation, Louisville, Ky., a corporation of Delaware Original No. 1,870,062, dated August 2, 1932, Serial No. 117,749, June 22, 1926. Application for reissue April 3, 1934, Serial No. 718,845

26 Claims. (Cl. 93—36)

Figure 6:
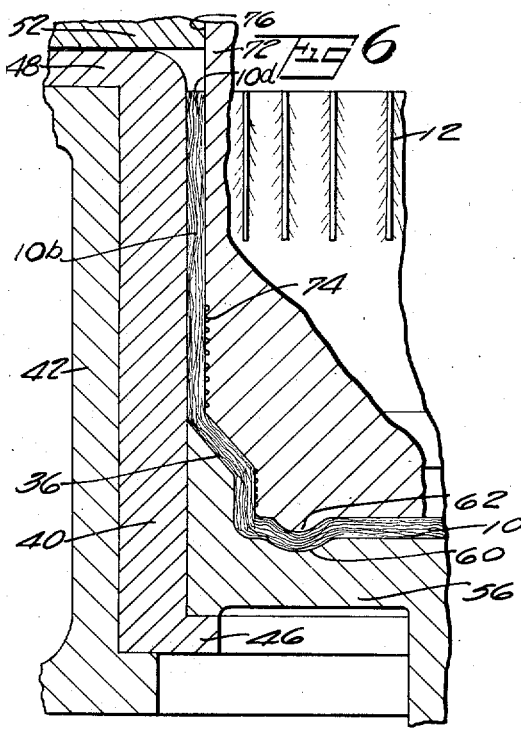

My invention relates to flanged, marginally reenforced paper articles and the process of making same, and particularly to one-piece paper articles.

The one-piece flanged and reenforced articles of the present invention, made of paper or other fibrous material having paper-like characteristics (all of which are referred to for convenience of expression as "paper"), are adapted for a wide variety of uses, as, for example, they may themselves be made use of, with or without a suitable cover, as cups, plates, or containers, or may be made use of as heads or ends or covers for other containers also made preferably of paper, or they may serve various other purposes.

The flanged margin of the paper disk (which is usually circular, but may be of other forms) is flowed inwardly into multiple folds and the multiple parts may be packed together under a very high pressure, for example, a pressure of about three to five tons per square inch, causing the multiple parts to be packed strongly together, and to provide a very strong and highly coherent marginal ring of substantially permanent gage dimension, which imparts great strength to the completed article.

The packing pressure is applied in accordance with my invention in a plurality of directions, and in different angularly related directions, as, for example, in directions at right angles to one another. Preferably, packing pressure is applied on the end of the infolded flanged portion, which may be conveniently referred to as vertically applied, and in directions at right angles thereto, which may similarly be referred to as horizontal application of pressure. By application of pressure, preferably in separate stages, in the directions referred to, a complete interknitting and packing of the folds and fibers is obtained in the marginal flanged ring, while the surfaces thereof are of high smoothness and finish, thus giving high strength together with handsome appearance.

While the invention is applicable to previously flanged disks, the flanging of the disk is preferably included in the process, at least in some forms of its application, and in the present disclosure the steps include the formation of the flange on the disk or blank, as well as the fabrication of the marginal infolded and packed ring portion thereof.

The multiple infolding of the flanged disk involves peculiar difficulties because of the nature of the flanged material to be handled. In drawing the flange there is a reduction in radius from that of the blank equal to the depth of the flange and, of course, a corresponding double reduction in the diameter. For example, in the case of making a flanged article, as a cup, three inches in diameter with a simple flange two inches deep, the original blank is about seven inches in diameter, and at the margin of the flange, stock having an original diameter of seven inches is compressed or shortened circumferentially to a diameter of three inches.

When flanging is done without permitting a substantial increase in thickness, as is preferable, the material of the flange is naturally very highly compressed and smoothly calendered, particularly at and near the edge of the flange remote from the central or base of the flanged cup so formed.

A flanged cup so formed may hold its shape if used in this condition and if nothing is done to it after simple flanging. If, however, it is attempted to turn the flange inwardly, as by means of applying a spinning tool to the edge, the cohesion of the fibers, which formerly held it, in the instance referred to, to a three inch diameter instead of the original seven inch diameter, is substantially released and is no longer effective to hold the fibres together, and, instead of spinning the flange inwardly in a reverse fold, as may readily be done, for example, with paper not preliminarily flanged, the result of such operation is merely to form the flanged edge into what may perhaps best be referred to as a sort of ruffle. Difficulties such as referred to are disposed of in accordance with the present invention and the release of cohesion about the edge of the flange is avoided by flowing the flanged wall inwardly substantially simultaneously about the entire margin of the flange.

Application of flowing means in this manner also secures the additional advantage that non-rotary, reciprocating movement devices, in the nature of a press, may be utilized therefore instead of rotary spinning apparatus, and a considerable simplification of operation obtained, with resulting increase in speed and decrease in cost of production.

While the invention may be practiced upon paper blanks of various forms, it may be applied with particular advantage to a circular blank with substantially V-shaped notches having inwardly directed apices evenly spaced about its periphery. This is for the reason that when extra deep flanges are drawn, having about the same thickness as the original thickness of the paper, the resulting high marginal compression above referred to as being encountered in drawing the flange is likely to be so great as to result in an embrittling of the paper at and near the edge of the flange, which will result in this part of the flange being so weak and brittle as to readily break. This embrittling effect due to unduly high compression of an unduly great amount of paper stock is avoided and substantially deeper flanges of high coherence and strength obtained by drawing a flange from a blank notched in substantially the manner described, thereby obtaining a reduction in the amount of paper stock and consequently of the extent of its compression in the neighborhood of the margin of the flange. The invention may be carried out, however, with unnotched blanks, particularly where the depth of flange is materially less than the maximum possible depth.

In the accompanying drawings I have illustrated a mode of performing the process of the present invention for production of illustrative forms of flanged and reenforced products and have illustrated such forms of products, but it is to be understood that such showing is illustrative only and is not presented for limitation of the invention, which is of the scope defined in my claims.

Figure 7:
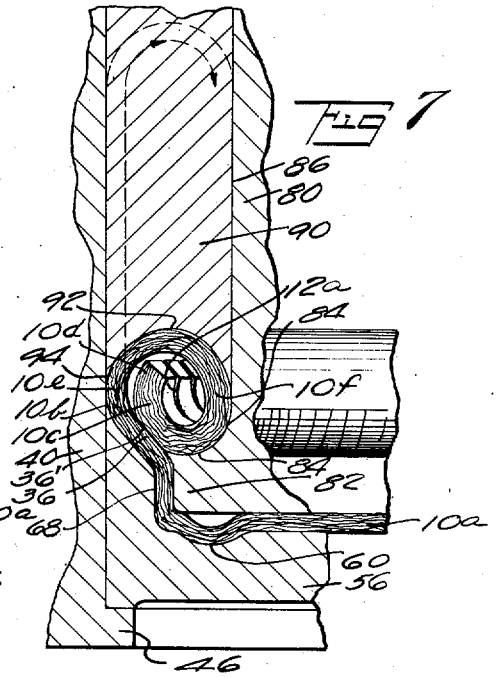
Figure 8:
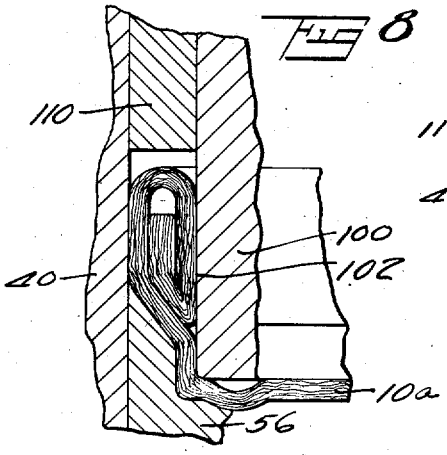
Figure 9:
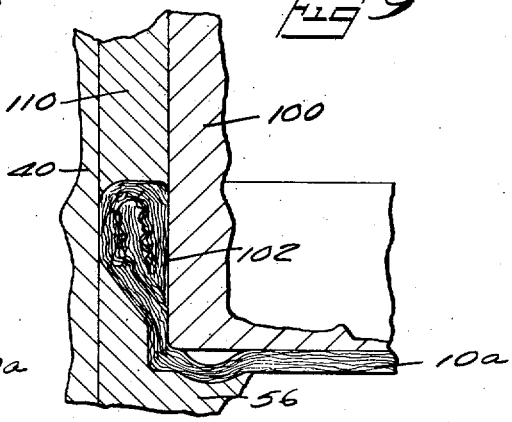
Figure 10:
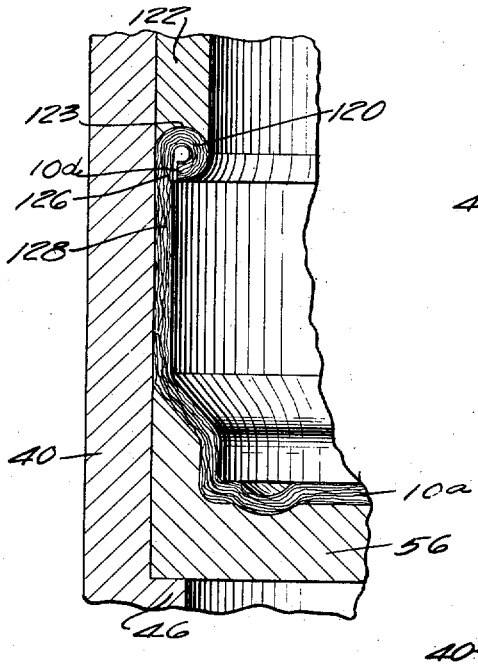
Figure 11:
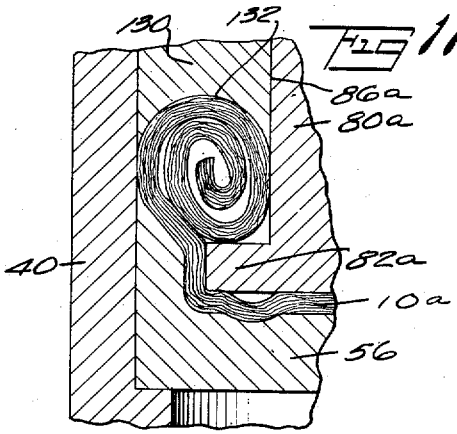
Figure 12:
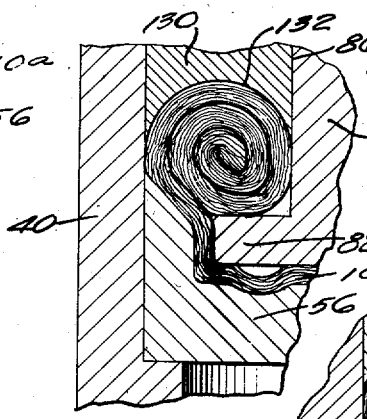
Figure 13:
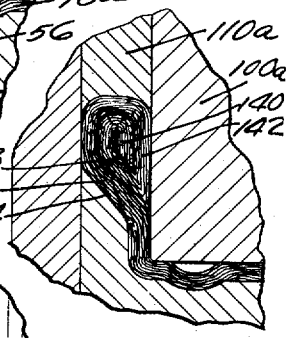
Figure 14:
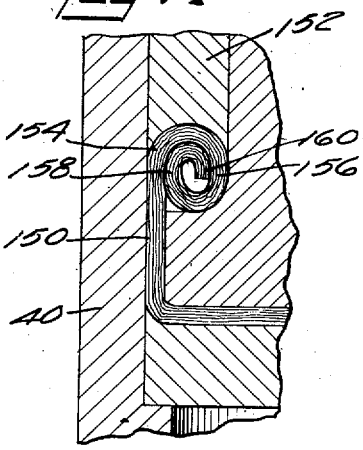
Figure 15:
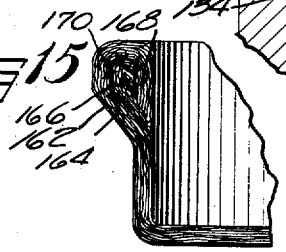

In said drawings, Fig. 1 is a part side and part cross-sectional view of a one-piece flanged rim fabricated paper article. Fig. 2 is a plan view of a notched blank. Fig. 3 is a section on line 3—3 Fig. 2. Fig. 4 is a fragmentary section of apparatus for carrying out the process, showing the blank inserted in position to be operated upon. Fig. 5 is a sectional view of the apparatus of Fig. 4, showing the position of the parts in an intermediate stage of the drawing of the flange. Figs. 6–9 are further sectional views; in which Fig. 6 shows the drawing of the simple flange completed, Fig. 7 shows the flowing of the flange, Fig. 8 shows the application of lateral pressure to the inturned flange material, and Fig. 9 shows the completion of the reenforced marginal ring by application of vertical pressure thereto. Fig. 10 is a sectional view showing a modification in which the flange margin is flowed into substantially a curl preliminary to the principal inflowing operation. Fig. 11 is a sectional view showing how a preliminarily curled flange may be flowed into multiple folds without bottom guiding. Fig. 12 is a view similar to Fig. 11 with the flowing ring fully depressed. Fig. 13 is a view similar to Fig. 9, but with the multiple inflowed flange margin of Fig. 11. Fig. 14 shows a further modification in which the multiple part margin is formed within a straight sided flange wall, and Fig. 15 shows the product of packing the multiple part margin of the flange shown in Fig. 14 when the packing operation is completed as in Fig. 9 or Fig. 13.

The paper blank is shown as provided with the evenly spaced peripheral notches 12 having their apices directed inwardly. The inner angle at 14 need not be a sharp angle, but may be more or less blunted or squared off to some advantage in the formation and upkeep of the blanking tool. Unnotched blanks may also be used, and the blank may be of other forms than circular.

Such blank may be utilized for making the product 16 shown in Fig. 1, which is adapted to be used in a large variety of ways, as, for example, for a head or cover for a container (not shown). The article or product 16 illustrated comprises the principal flat portion 18 provided with a strengthening exterior bead 20 and corresponding interior groove 22, and with the flange 24 terminating in the infolded packed annular marginal ring 26 of permanent gage dimension and high strength made up of three thicknesses of material, 28, 30 and 32, firmly knitted and packed together (see Fig. 9). The reenforced flange 24 is shown as being formed with a smooth inner face 34, extending throughout the entire depth of flange including the reenforced marginal ring part 26, which makes it well adapted for being used at a cover or head (top or bottom) for a cylindrical container, and with the provision of such smooth continuous inner face 34 there is an outward bevel 36 provided at the junction of the reenforced rim part or ring 26 with the body part or non-reenforced part 38 of the flange 24 below (this term, like the terms horizontal, vertical, etc., is used in the relative sense, as will be understood) th reenforced ring part 26. The tools illustrate n Figs. 4–9 for carrying out the process are made for production of this particular product. With changes in the form of the product as may extensively be made within my invention, there will, of course, be corresponding changes in the form of tools, as shown, for example, in Figs. 10–14, but the showing herein made is sufficient to illustrate the principle of the invention.

A female die 40 is shown supported in the die bolster 42, which may comprise a heating chamber 44, which is of advantage in rapid operation. Die 40 has the form of a hollow cylinder with a bottom seating or supporting ledge 46 and a flat table or flange 48 for receiving the blank 10 properly centered therein. The table 48 and inner cylindrical wall 50 of die 40 meet in a rounded corner 51 to avoid breakage of the paper stock in the drawing operation.

The undrawn paper stock is confined by the pressure backing plate 52 to which pressure is applied, to hold the stock flat and keep it smooth during the drawing operation. The pressure applied is not sufficient to retard materially the movement of the paper inwardly upon the table 48 during the drawing operation, but pressure plate 52 is held against upward movement during the drawing operation, as by its carrying bar 53, so that there can be no material movement in an upward direction of the paper or parts thereof, which might prevent a smooth drawing operation being obtained. The downward movement of the backing plate 52 is terminated by coming into contact with adjustable stop means, as the screws 54, which are set according to the stock used to put the paper under suitable tension without actually clamping it, so that it could not be moved inwardly during the drawing operation. Member 52 also serves as a stripping plate. This function will be referred to later.

In the drawing operation, I preferably make use of dies for holding the bottom of the paper cup between them. The under or receiving die is indicated by reference numeral 56 and the male die, which enters the interior of the cup by numeral 58. The cup bottom 10*a* is gripped between dies 56, 58, as, for example, die 56 may operate against a brake and the downward drawing pressure be applied to male die 58 to move the cup bottom 10*a* and the receiving die 56 along with it.

Where the shallow cup 16 is the article produced, dies 56 and 58 are of suitable conformation therefor, receiving die 56 having an annular groove 60 to produce the bead 20, and die 58 having in turn the annular bead 62 to make the groove 22, receiving die 56 having a marginal upwardly extending ring portion 64, the outer wall 66 whereof has a sliding fit within the female die 40 and the interior wall whereof comprises the substantially cylindrical or slightly flared portion 68 to form the flange part 38 and the beveled part 70 to form the bevel 36. The male die 58 is correspondingly shaped, but of sufficiently smaller dimension to receive the paper stock between it and the receiving die at the lower part and between it and the female die 40 above the receiving die 56. The outer wall of male die 58 thus comprises the lower substantially cylindrical or slightly flared part 68′, beveled part 70′ and the principal part of its wall, which is substantially cylindrical and enters the female die with only the paper between them, is represented by numeral 72. Parts 68′ and 72 are preferably provided with paper gripping surfaces, as, for example, very fine screw threads 74 may be cut therein.

It will be readily understood from the foregoing how the blank is drawn into a cup with a single thickness flange wall. The blank, which has preferably been previously impregnated with a suitable impregnation material such as paraffine wax, for example, is initially placed on table 48 with receiving die 56 under it and the male die 58 above it, as shown in Fig. 4, and the pressure plate 52 being held down to prevent deformation of the skirt of the blank, power is applied to force male die 58 downwardly, and the flange is drawn by longitudinal movement of male die 58, the receiving die 56 being forced downwardly therewith against braking resistance or other suitable resistance so as to grip bottom 10*a* of the cup as a whole and to press it into the form selected. The gripping surfaces 74 assist in distributing the application of the force used in the drawing operation.

The depth of the tools is such that the upper edge 10*d* of the drawn cup comes well below plate 52 when the receiving die 56 reaches the limit of movement and rests on ledge 46 (Fig. 6).

The male die 58 may now be withdrawn, and the bore 76 of pressure plate 52 fitting closely about the main part 72 of male die 58 causes plate 52 to serve as a stripper plate upon upward retreating movement of male die 58.

The flanged cup is thus left in place as also the receiving die 56, and while the cup may be pulled upwardly a short distance away from receiving die 56 upon retreat of male die 58, it nevertheless is kept in place within female die 40 by the combined presser and stripping plate 52, and if raised, is pushed back down on receiving die 56 by the insertion of the expanding male die now to be referred to.

This expanding male die 80, Fig. 7, enters in contracted form within the female die 40 after male die 58 is withdrawn and within the paper cup and after being moved downwardly until stopped by the cup bottom resting on the receiving die 56, is expanded, (as by means of relatively movable wedging surfaces, such as customarily used for the expanding of expansible male dies). When die 80 is expanded, the lower projecting part 82 thereof serves to clamp part 38 of the cup flange against the corresponding part 68 of receiving die 56, and the rounded out or concaved upper guide portion 84 of projecting part 82 of die 80 serves as a guide to control the turning of the flange during the fold flowing operation. An annular opening is left between the shank part 86 of die 80 and the female die 40 for the insertion of the flowing die 90.

Said die 90 is of annular form to enter and fit in the space between the bore wall of female die 40 and the relatively reduced shank portion 86 of the male expanding die 80, as shown in Fig. 7. The lower margin of the flowing ring or die 90 is transversely concaved on substantially the semicircular arc of a circle as shown at 92 with a preferably sharp outer edge 94, where it comes against the female die 40. The thickness of flowing ring 90 and the space provided for its reception is somewhat greater than the product of the paper thickness multiplied by the number of folds to be formed to permit a relatively wide flowing action to take palce. Upon the depression of flowing ring 90 and the sharp edge 94 getting in behind the margin of the flange 10*b*, the flange 10*b* is caused to travel or flow inwardly as indicated in dotted arrows at the upper part of Fig. 7, and as the flowing die 90 moves downwardly, the flange 10*b* is turned or flowed inwardly, along the curved surface 92 and finally, as it turns downwardly and encounters and is guided by the concave guiding wall 84 of male expanding die 80, it is guided around upon itself and along the inner wall 36′ of the beveled part 36 of the cup until the free edge 10*d* turns upwardly and the marginal part 10*c* is brought in between the fold parts 10*e* and 10*f*, and a triple relatively loose fold formed, about as shown in full lines in Fig. 7. Where the blank was initially notched, the walls of notches 12 are closed or practically closed together in the flanging operation as shown at 12*a*, Fig. 7, and upon the formation of the triple fold as described these cut apart edges are tucked or folded into the interior of the interfolded marginal part of the flange. Partial release of the cohesion obtained in flanging may manifest itself in a spreading or thickening of the stock, as indicated by the thickening of parts 10*c* and 10*f* in Fig. 7, and the wider spacing and lightening of the hatch lines in these parts. Upon the completion of the triple fold, the flowing die 90 is withdrawn and the expanding male die 80 is contracted to clear the infolded flange and withdrawn, and these withdrawal movements may take place simultaneously or practically so, if desired.

The expansion plug 100, Fig. 8, is then introduced in contracted form and expanded. Said plug 100 when radially expanded has a cylindrical inner wall 102 adapted to form the smooth inner paper flange wall 34. Expansion of plug 100 brings the parts of the triple folded flange into approximately their ultimate relation in the direction of thickness of the marginel flange, as shown in Fig. 8, and same are confined, except at the top so that the triple folded flange upon being compressed laterally by expansion of expansible plug 100, as indicated in Fig. 8, may expand upwardly to some extent as is also indicated in this view.

The annular packing ring 110 is now depressed to engage the triple folded flange at the only previously unconfined part, namely, the top thereof, and by application of exceeding high consolidating pressure thereon, the triple folded margin of the flange is packed or consolidated together into the form shown in Figs. 1 and 9, and upon being so packed or consolidated the finished product will retain substantially its fixed gage dimensions upon removal from the forming dies.

While the exterior of the packed ring 26 is of a high degree of calendering and smoothness, it would be found, as upon dissection, that in the interior the fold lines have practically disappeared and the material is crumpled and packed together about as indicated in cross-section in Fig. 9. The packed paper ring so formed is very hard and strong, is practically moisture proof and resembles hard wood or ivory rather than ordinary paper, and the resulting reenforced flanged disk cover, cup or the like is a permanently dimensioned product of high utility for the various uses to which it is to be put, some instances of which have been referred to above.

When packing operation is completed as described, the packing ring 110 and plug 100 are withdrawn, the latter being first contracted, and the product 16 discharged by the receiving die 56 being moved upwardly to the position of Fig. 4 ready to receive a new blank, and the operation is repeated indefinitely, and may be carried on with the utmost rapidity, since substantially only rectilinear movement of working parts is involved.

When the blank or flanged disk has been impregnated with suitable impregnating material having cementitious and lubricating qualities, such as paraffine wax, for example, which may be done with considerable advantage in facilitating the flange flowing operation, such impregnation material even if confined largely to the surfaces of the paper parts at the first will be found to be distributed practically uniformly throughout all parts of the final packed multiple part ring 26 so as to form practically an integral mass therewith. Even if the base of the cup is left unimpregnated it is desirable and essential with many grades of paper or paperlike material that the flange part be impregnated, since the takeoff in flowing the flange must be from a flange edge, which is entirely free from buckling. Where there is any buckling of the flange edge prior to folding by flowing, the parts will not be properly flowed into folds, but will tend to wrinkle together or pile up on one another with resulting loss of strength, and it is, therefore, essential that all buckling of the flange edge is to be avoided.

In Figs. 10–14 I have shown how by initially curling the margin of the flange, as indicated at 120, a packed flange ring may be produced with four or more folded parts therein. This preliminary margin curling step may be made use of in connection with the steps already described with respect to Figs. 1–9, but is of especial utility where the expanding male die 80*a*, as shown in Figs. 11 and 12 lacks the rounded guiding portion 84 already described, and is of other formation, as, for example, is formed with the extension part 82*a* projecting squarely from the shank 86*a* of die 80*a*, instead of having the filleted or rounded guiding portion 84, as shown in Fig. 7.

Fig. 10 illustrates the formation of the preliminary margin curl 120 in the paper flange by means of a curling ring or die 122 having a relatively-short-radius arcuate curling groove 123 formed in the under face thereof. After being moved downward to a sufficient extent to flow the free edge 10*d* along such radius into contact with or substantially into contact with the body portion 126 of the flange 128, the curling die 122 may retreat, leaving the flange 128 with the marginal curl 120.

By substantially replacing the free edge of the flange 128 with a short radius marginal curl the further inflowing operation is greatly facilitated and on applying the flowing die 130 (Fig. 11) with the larger radius groove 132 the stock is naturally, so to speak, flowed into practically as many turns as may be desired and this without reliance on rounded guiding surfaces or the male die, such as shown at 84, Fig. 7.

When the flowing die 130 is brought down as far as it will go, a formation such as shown in Fig. 12 can be produced with a very considerable number of folds or turns, six parts being shown in Fig. 12.

The insertion (contracted) and expansion of expansible male die 100*a* may operate to turn the folded parts backwardly to some extent, and there may be a small reduction in the number of parts forming the final packed ring when the male die 100*a* has been expanded to compress the parts laterally, and the final high packing pressure applied by the packing die 110*a*. Fig. 13 shows such a reduction in number of parts from the five parts of Fig. 11 down to four parts in Fig. 13, in which the final packed ring 134 comprises a firmly consolidated four-ply structure made up of the parts designated as 136, 138, 140 and 142, though it will be understood that the separate plies are so firmly knit together as to form a coherent solid mass with the fibers so interknit together that it is very difficult indeed to separate the plies or to distinguish them one from another.

In Figs. 1–13 I have illustrated a double drawn flange with a smaller diameter part adjacent to the cup bottom, and a larger diameter part including the margin 10*d*. If desired, however, the flange may be drawn with a smooth, one-diameter outer wall as shown at 150, Fig. 14, and the margin flowed inwardly by the flowing die 152, producing the three complete plies 154, 156 and 158, and a fourth partial or incomplete ply 160. This structure when packed as in the case of Figs. 9 and 13 produces the marginal ring 162 of Fig. 15 with the three complete plies 164, 166 and 168, and the tucked in or incomplete ply 170, and the make up may be variously modified, as will be understood.

It will be understood that the particular structures shown and the tools for their formation are illustrative merely and that flanged articles of great variation in form, depth and the like may be produced without departing from my invention.

I claim:

1. In the process of making flanged, marginally reenforced paper articles, the step of simultaneously inflowing the flange margin all the way around on a relatively broad radius into a multiple ply fold composed entirely of material of the flange.

2. In the process of making flanged, marginally reenforced paper articles, the steps of inflowing the flange margin on a relatively broad radius into a multiple fold composed entirely of material of the flange, and with the raw flange edge in substantially the middle of the fold, and consolidating the infolded parts of the flange by application of consolidating pressure thereto.

3. In the process of making flanged, marginally reenforced paper articles, the steps of inflowing the flange margin on a relatively broad radius into a multiple fold composed entirely of material of the flange and with the originally raw flange edge inside the fold, and applying packing pressure in a plurality of different angularly related directions to the infolded parts of the flange.

4. In the process of making flanged, marginally reenforced paper articles, the steps of infolding the flange margin simultaneously all the way around into a multiple fold composed entirely of material of the flange, and with the raw flange edge inside the folds, applying pressure to and confining the folded parts laterally, and applying packing pressure in a right line to the folded and confined parts at the edge thereof.

5. In the process of making flanged, marginally reenforced paper articles, the steps of flowing the flange margin inwardly simultaneously all the way around on a relatively broad radius and guiding the edge thereof so that same is folded in and interposed directly between the flange wall and an inturned part formed from the original flange wall.

6. In the process of making flanged, marginally reenforced paper articles, the steps of applying flowing pressure to the flange margin simultaneously all the way around on a relatively broad radius and guiding the edge thereof inwardly, downwardly and upwardly and outwardly, so that a multiple ply fold is produced composed entirely of material of the flange, and with the part originally forming the raw edge of the flange inside between the flange wall and an inturned portion thereof.

7. In the process of making flanged, marginally reenforced paper articles, the steps of flowing the flange margin inwardly simultaneously all the way around while guiding the edge thereof so that same is led upwardly between the flange wall and an inturned part thereof and a triple fold is formed composed entirely of material of the flange, applying pressure to and confining the folded portion laterally, and applying packing pressure to the folded and confined parts at the edge thereof, whereby a closely packed, highly coherent marginal ring of permanent gage dimension and high strength is produced.

8. The process of making a deeply flanged marginal reenforced article of paper, which consists in forming a blank with substantially V-shaped notches substantially evenly spaced about the periphery thereof, drawing a deep flange on said blank, whereby the notches are substantially closed, infolding the margin into a triple fold with the notched or incised part between the flange wall and an inturned part thereof, and subjecting the folded portion to packing pressure on all sides, whereby a marginal ring is obtained of high strength and coherence with the incised parts of the blank substantially enclosed within the interior of the marginal ring.

9. In the process of making flanged marginally folded paper articles, the steps of curling the flange margin on a relatively small radius followed by flowing it into multiple folds composed entirely of material of the flange, and on a radius larger than used in curling the flange margin.

10. The process of making a marginally reinforced article of paper material which comprises flowing the marginal portion of the body wall of the article on a broad radius and biasing the advance portion of the flowing material to cause the same to freely move towards and in reverse direction along the body wall into position between the marginal parts.

11. The process of making a marginally reinforced article of paper material which comprises flowing and curling the marginal portion of the body wall of the article on a broad radius, and directing the advance portion of the flowing material so as to cause the same to freely move into position between the body wall and a turned over marginal portion thereof.

12. The process of making a marginally reinforced article of paper material which comprises causing the marginal portion of the body wall to freely flow and curl with a directive bias impressed upon the advance portion of the flowing material so that the edge thereof clears the body wall and moves into position between opposing marginal parts.

13. The process of making a marginally reinforced article of paper material which comprises curling the marginal portion of the body wall of the article to impress a directive bias thereon, and then curling the marginal portion on a relatively wide radius to cause the advance portion of the material to flow under said directive bias into position between opposing marginal parts.

14. The process of making a marginally reinforced article of paper material which comprises curling the marginal portion of the body wall of the article on a relatively short radius, and then flowing and curling the marginal portion in the same direction on a relatively longer radius and causing the advance portion of the flowing material to reverse direction and freely move into position between opposing marginal parts under a directive bias imposed on the material by said first curling operation.

15. The process of making a marginally reinforced article of paper material which comprises forming a relatively small curl on the marginal portion of the body wall, and then flowing the marginal portion in the same direction on a broader radius and causing the advance portion of the flowing material to reverse direction and move under the directive bias imposed on the material by said first curling operation into position between the opposing marginal parts.

16. The process of making a marginally reinforced article of paper material which comprises causing the marginal portion of the body wall of the article to freely curl under flow pressure, and causing the advance portion thereof under a directive bias impressed thereon to freely flow into position between a portion of the body wall and an opposing portion thereof, and consolidating said portions by applying pressure thereto.

17. The process of making a marginally reinforced article of paper material which comprises flowing and curling the marginal portion of the body wall on a relatively wide radius while imposing a directive bias on the advance portion of the flowing material to cause the same to move freely towards and in the reverse direction along the body wall and into position between the opposing marginal parts, applying pressure laterally to the overlapping parts and confining the same in parallel, contacting relation, and then applying pressure lengthwise of the plies, while thus laterally confined, to further consolidate the same.

18. The process of forming flanged articles from blanks of paper material which comprises compressing an intermediate portion of the blank between opposing die members to cause deformation of the material into a shape corresponding to that of the die members, and retaining said deformed intermediate portion clamped between said members while drawing the flange at the marginal part.

19. The process of forming flanged articles from blanks of paper material which comprises deforming the material of an intermediate portion of the blank into a desired shape by compressing the same between opposing die members, and drawing the marginal flange portion with said intermediate portion clamped between said members to prevent change in shape thereof resulting from the flange drawing operation.

20. The process of forming flanged articles of paper material which comprises deforming an intermediate portion of the blank into a desired shape by the action of opposing die members, and then moving said members together against a brake resistance to cause the flange to be drawn while said intermediate portion is retained under pressure between said members.

21. The process of forming flanged articles from blanks of paper material which comprises disposing the marginal portions of the blank between opposing outer members for retaining the undrawn material flat and allowing feed thereof as the same is being drawn, subjecting an intermediate portion of the blank to the action of a pair of relatively movable inner die members for deforming the material into a desired shape, and drawing the flange by relative movement between the inner and outer members while retaining said intermediate portion clamped between said inner members.

22. The process of forming flanged articles from blanks of paper material which comprises deforming an intermediate portion of the blank by relative movement of die members disposed at opposite sides of the material, and then causing said members to move together for drawing the flange at the marginal part while said intermediate portion is retained clamped between said members.

23. The process of forming flanged articles from blanks of paper material which comprises subjecting the intermediate portion of the blank to the action of a pair of die members to form a reinforcement about said intermediate portion, and retaining said intermediate portion clamped between said members while drawing the flange at the marginal portion to preserve the shape imposed on the material in forming said reinforcement.

24. The process of forming flanged articles from blanks of paper material which comprises drawing the flange from the marginal portion of the blank, flowing the flange margin on a relatively broad radius into a multiple ply curl, applying pressure laterally to the overlapping parts and confining the same in parallel, contacting relation, and then applying pressure lengthwise of the plies, while thus laterally confined, to consolidate the same.

25. The process of forming flanged articles from blanks of paper material which comprises forming a blank with substantially V-shaped notches in the periphery thereof, drawing the flange from the marginal portion of the blank, flowing the flange margin inwardly on a relatively broad radius to position the notched margin between the flange wall and an inturned part thereof, and subjecting the folded portion to consolidating pressure.

26. The process of forming flanged articles of paper material which comprises compressing an intermediate portion of the blank between a pair of die members operating against a brake resistance and thereby imposing a deformation upon the material corresponding to the shape of the dies, and then drawing the flange by continued movement of said die members against said brake resistance and with said deformed intermediate portion clamped between said members to preserve the shape imposed upon the material of said intermediate portion by the action of the dies.

ARLINGTON MOORE.